United States Patent
Corbett et al.

(10) Patent No.: US 10,809,899 B2
(45) Date of Patent: Oct. 20, 2020

(54) COMPUTING DEVICE MIRRORING ON A MARINE ELECTRONICS DEVICE

(71) Applicant: NAVICO HOLDING AS, Egersund (NO)

(72) Inventors: Andrew Corbett, Auckland (NZ); Phillip King Gaynor, Concord, NH (US)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 16/191,880

(22) Filed: Nov. 15, 2018

(65) Prior Publication Data

US 2020/0026417 A1  Jan. 23, 2020

Related U.S. Application Data

(60) Provisional application No. 62/701,185, filed on Jul. 20, 2018.

(51) Int. Cl.
*G06F 3/0484* (2013.01)
*H04L 29/08* (2006.01)
(Continued)

(52) U.S. Cl.
CPC ............ *G06F 3/04845* (2013.01); *G06T 3/60* (2013.01); *H04L 67/36* (2013.01); *H04M 1/7253* (2013.01);
(Continued)

(58) Field of Classification Search
None
See application file for complete search history.

(56) References Cited

U.S. PATENT DOCUMENTS 8,265,866 B2 * 9/2012 Altamura ............... G01C 21/20
                                                    701/409
8,645,012 B2   2/2014 Salmon et al.
(Continued)

FOREIGN PATENT DOCUMENTS

| WO | WO 2006/017511 A2 | 2/2006 |
| WO | WO 2013/126761 A1 | 8/2013 |
| WO | WO 2014/144471 A1 | 9/2014 |

OTHER PUBLICATIONS

Samsung SideSync—Stronger Solution to Connect you PC & Mobile Device (6 pgs.) Website visited Feb. 27, 2019 https://www.samsung.com/us/sidesync/.

(Continued)

*Primary Examiner* — Edward Martello
(74) *Attorney, Agent, or Firm* — Nelson Mullins Riley & Scarborough LLP

(57) ABSTRACT

An apparatus for providing marine information is provided including a user interface, a processor, and a memory including computer program code. The memory and the computer program code configured to, with the processor, cause the apparatus to establish data communication with a remote computing device, receive user interface display data from the remote computing device, determine a display mode for the user interface, generate a mirror user interface display based on the user interface display data and the display mode, and cause the mirror user interface display to be displayed on the user interface in a predetermined orientation based on the display mode to maximize utilization of space allocated to the mirror user interface display on the user interface.

19 Claims, 8 Drawing Sheets

(51) Int. Cl.
    *H04M 1/725* (2006.01)
    *G06T 3/60* (2006.01)
(52) U.S. Cl.
    CPC ..... *H04M 1/72552* (2013.01); *G06T 2200/24* (2013.01)

(56) References Cited

U.S. PATENT DOCUMENTS

| | | | |
|---|---|---|---|
| 8,761,976 B2 | 6/2014 | Salmon et al. | |
| 9,132,900 B2 | 9/2015 | Salmon et al. | |
| 2009/0037040 A1 | 2/2009 | Salmon et al. | |
| 2010/0262673 A1 | 10/2010 | Chang | |
| 2014/0013276 A1 | 1/2014 | Butterworth | |
| 2014/0336854 A1 | 11/2014 | Salmon et al. | |
| 2015/0048924 A1* | 2/2015 | Feldstein | G07C 9/00103 340/5.51 |
| 2016/0171775 A1* | 6/2016 | Todeschini | G06Q 30/016 345/633 |
| 2016/0313955 A1 | 10/2016 | Jopling | |
| 2017/0235435 A1* | 8/2017 | Sohn | G06F 3/0481 715/738 |
| 2017/0309163 A1* | 10/2017 | Lian | G08C 17/02 |

OTHER PUBLICATIONS

Argonaut M7 Touch Monitor (2 pgs.) Website visited Feb. 27, 2019 https://www.argonautcomputer.com/products/m7-smart-touch-monitor.

Kenwood Air Mirroring /Android Wireless Mirroring Solution Video (1pg.) Website visited Feb. 27, 2019 https://www.youtube.com/watch?v=1gB3yETOleo.

Apple CarPlay (11 pgs.) Website visited Feb. 27, 2019 https://www.apple.com/ios/carplay/.

AndriodAuto (6 pgs.) Website visited Feb. 27, 2019 https://www.android.com/auto/.

* cited by examiner

COMPUTING DEVICE MIRRORING ON A MARINE ELECTRONICS DEVICE

CROSS REFERENCE TO RELATED APPLICATION

This application claims priority to U.S. Provisional Application No. 62/701,185, entitled "Computing Device Mirroring on a Marine Electronic Device", filed Jul. 20, 2018, which is hereby incorporated by reference in its entirety.

FIELD OF THE INVENTION

Embodiments of the present invention relate generally to device interoperability, and more particularly, to systems and apparatuses for providing user interface mirroring of a remote computing device on a marine electronics device of a marine vessel.

BACKGROUND OF THE INVENTION

A marine electronics device may be configured to receive marine data from one or more data sources, such as from sonar transducer(s), position sensor(s), environmental sensor(s), etc. The marine electronics device may be mounted to a marine vessel. In such a regard, the marine data may be presented on a display of the marine electronics device for a user of the vessel.

Users may utilize a computing device, such as a smart phone, tablet computer, laptop computer, or the like to facilitate many different functions, such as general computing, interaction with applications, internet surfing, data communication with other persons (e.g., via text, video, and/or audio connections), etc.

BRIEF SUMMARY OF THE INVENTION

Computing devices, such as smart phones, tablet computers, laptops, or the like may not be suitable for use in a marine environment. For example, a computing device may be damaged or destroyed by exposure to water, especially salt water. Additionally, bright day time conditions and movement of the watercraft (e.g., vessel) may make the screen hard to see and/or difficult to interact with.

In contrast, a marine electronics device (MED) of a vessel may be specifically designed for use in a marine environment. For example, the marine electronics device may be equipped with heat processing equipment that enable usage even when in extreme weather conditions, such as prolonged exposure to direct sunlight. As another example, the screen of the marine electronics device may be configured to be resistant to effects from the sun, water, or other elements that are common in the marine environment. Further, the marine electronics device may be connected to various sensors or systems of the vessel and provide useful marine data to a user.

In this regard, some embodiments of the present invention provide for an improved mirroring application that enables mirroring of the remote computing device on the marine electronics device, which is ideal for the marine environment. In some embodiments, additional or improved features over standard mirroring applications may be provided.

For example, the MED may be configured to dynamically adjust the mirrored user interface display between at least landscape and portrait views based on the status of the MED display, such as full screen, split screen, multiscreen views, or the like and/or a preference user interface orientation of an application.

In some example embodiments, the MED may emulate one or more physical buttons of the computing device. In such example embodiments, the MED may display one or more computer image generated buttons corresponding to the one or more physical buttons of the computing device, such as a home button, back button, menu button of the like. This may enable application functions to be performed via the user interface of the MED that were not previously possible through simple mirroring of the user interface of the computing device. Additionally, more intuitive use of the mirroring may be enabled by such soft buttons.

In an example embodiment, the MED may be configured with one or more application bridge functions. For example, the MED may have a physical or virtual button, such as a send text message button, that, when pressed, launches a message application on the computing device and/or the MED. This may enable user of the MED to more easily/quickly interact with the computing device. In the provided example, the user may write the text message in an application interface provided by the MED. The message may then be transmitted to and entered into the message application running on the computing device. Additionally or alternatively, the text message button may cause the message application running on the computing device to open and an application interface to be mirrored on the MED, such that the user can enter the message. This may provide a quick, one step, process for launching an application from the computing device on the MED. Similarly, an email button may be provided and utilized in a similar manner.

In some example embodiments, the MED may be provided with a screen shot button. In such an example embodiment, the user may interact with the screen shot button to capture displayed marine data, including, but not limited to sonar data, chart and/or position data, marine conditions, or the like. The MED may then cause a communication application, such as text messaging or email application, running on the computing device to open on the MED and populate the application with the screen shot data. The screen shot data may be text, still picture, and/or video data corresponding to the data displayed on the user interface at the time the screen shot was initiated. The user may then interact with the mirrored user interface to cause the computing device to send the screen shot data to a third party, such as via cellular or WiFi communications.

In some example embodiments, the MED may be configured to remember computing devices and automatically connect with the computing device, when the computing device is proximate to the MED. For example, the user may register, or pair the computing device with the MED using WiFi, Bluetooth, Bluetooth low energy (BLE), near field communication (NFC), or the like. The MED may remember the communication settings, such that when the computing device is subsequently brought within communication range of the MED, the MED automatically establishes data communication with the computing device.

In an example embodiment, the MED may utilize the computing device for data communication with the internet, cloud database, or the like. The MED may transmit data to the computing device via a BLE, local Wi-Fi connection, or the like. The computing device may then, in turn transmit the data to a cloud database or third party utilizing, cellular communication, satellite communication, WiFi, or the like. In some cases, the data may be automatically transmitted by the MED and computing device based on one or more settings in an application, the MED, and/or the computing device, such as digital services or updates to the MED, computing device, and/or the application.

An example embodiment of the present invention includes an apparatus for providing marine information. The apparatus includes a user interface, a processor, and a memory including computer program code. The memory and the computer program code are configured to, with the processor, cause the apparatus to establish data communication with a remote computing device, receive user interface display data from the remote computing device, determine a display mode for the user interface, generate a mirror user interface display based on the user interface display data and the display mode, and cause the mirror user interface display to be displayed on the user interface in a predetermined orientation based on the display mode to maximize utilization of space allocated to the mirror user interface display on the user interface.

In some example embodiments, the memory and computer program code are further configured to cause the apparatus to dynamically adjust the orientation of the mirror user interface display based on a change in the display mode of the user interface.

In some example embodiments, the predetermined orientation includes a landscape orientation or a portrait orientation.

In some example embodiments, the display mode includes a full screen mode and a split screen mode, and the memory and computer program code are further configured to cause the apparatus to generate the mirror user interface display in the landscape orientation in an instance in which the display mode is the full screen mode and in the portrait orientation in an instance in which the display mode is the split screen mode.

In some example embodiments, the display mode includes a full screen mode, a split screen mode, or a multiscreen mode. In an example embodiment, the split screen mode includes at least two user interface areas, and the mirror user interface display is displayed in one of the at least two user interface areas.

In some example embodiments, the memory and computer program code are further configured to cause the apparatus to determine a mounting orientation of the apparatus, and generating and displaying the mirror user interface display is further based on the mounting orientation of the apparatus. In some example embodiments, the mounting orientation is determined based on a user input defining the mounting orientation of the apparatus. In some example embodiments, the mounting orientation is determined based on an orientation indication received from an orientation sensor associated with the apparatus. In an example embodiment, the orientation sensor includes a gyroscope or accelerometer.

In another example embodiment, an apparatus for providing marine information is provided. The apparatus includes a user interface, a processor, and a memory including computer program code. The memory and the computer program code are configured to, with the processor, cause the apparatus to establish data communication with a remote computing device, receive an indication of interaction with a bridge function interface, provide instructions to the remote computing device to cause an application on the remote computing device associated with the bridge function interface to open, and cause an application interface associated with the application to be displayed on the user interface.

In some example embodiments, the application interface includes a mirror user interface.

In some example embodiments, the memory and computer program code are further configured to cause the apparatus to generate a bridge user interface associated with the application. The application interface includes the bridge user interface. The memory and computer program code are further configured to cause the apparatus to cause instructions corresponding to user inputs provided to the bridge user interface to be transmitted to the application running on the remote computing device.

In some example embodiments, the application is a text message application.

In some example embodiments, the application is an email application.

In some example embodiments, the memory and computer program code are further configured to cause the apparatus to capture marine data and cause the captured marine data to be transmitted to the application running on the computing device.

In some example embodiments, the captured marine data includes text data, picture data, or video data corresponding to data displayed on the user interface at a time when the bridge function interface was interacted with.

In yet another example embodiment, an apparatus for providing marine information is provided. The apparatus including a user interface, a processor, and a memory including computer program code. The memory and the computer program code are configured to, with the processor, cause the apparatus to establish data communication with a remote computing device, receive user interface display data from the remote computing device, generate a mirror user interface display based on the user interface display data, and cause the mirror user interface display to be displayed on the user interface. The mirror user interface display includes at least one computer image generated button corresponding to a physical button on the remote computing device.

In some example embodiments, the memory and computer program code are further configured to cause the apparatus to receive an indication of interaction with a computer image generated button and transmit an instruction to the remote computing device. The instruction corresponds to the interaction with the computer image generated button.

In some example embodiments, the at least one computer image generated button includes a home button, a back button, or a menu button.

Additional example embodiments of the present invention include apparatuses, methods, systems, and computer program products associated with various embodiments described herein, including, for example, the above described device embodiments.

BRIEF DESCRIPTION OF THE DRAWINGS

Figure 1:
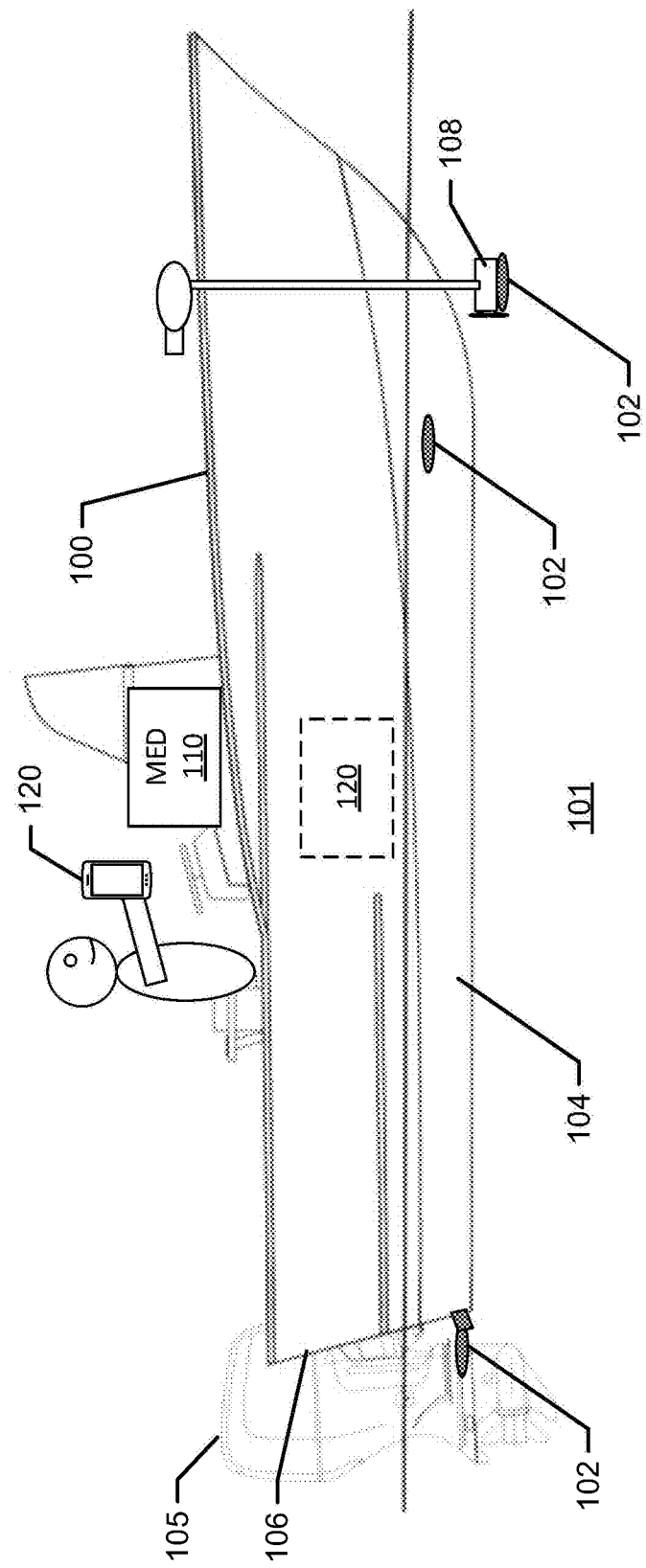
Figure 2A:
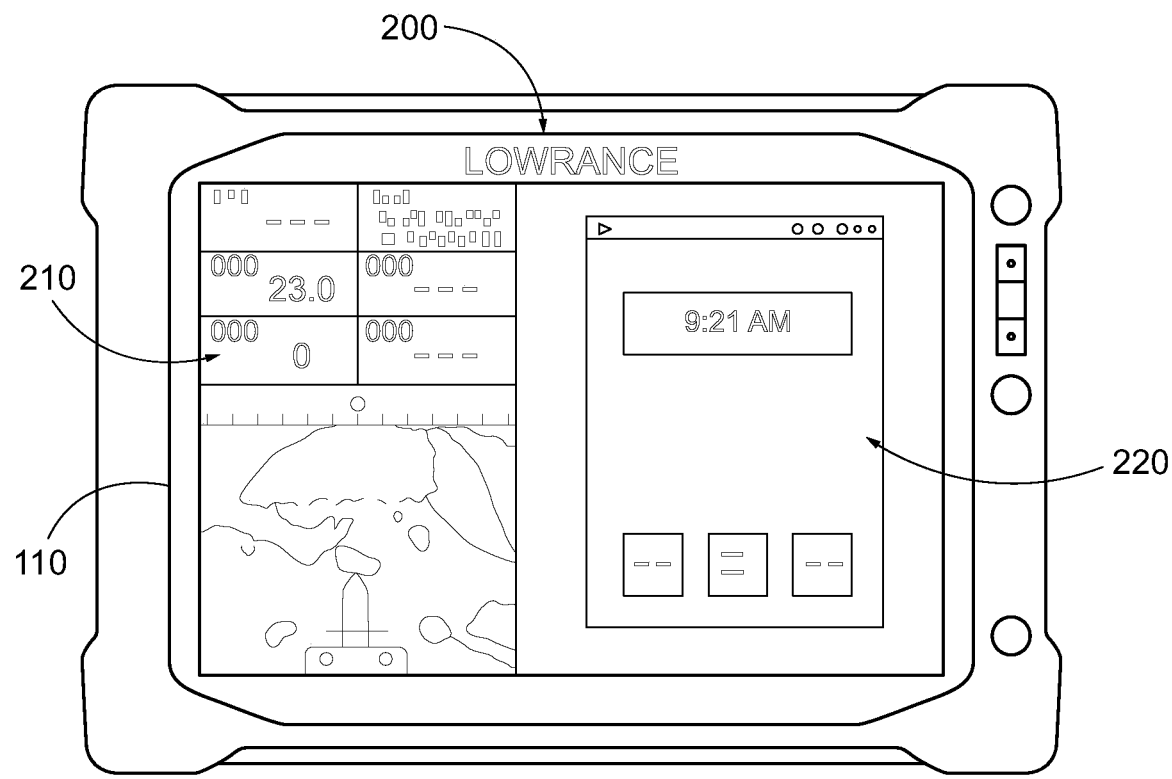
Figure 2B:
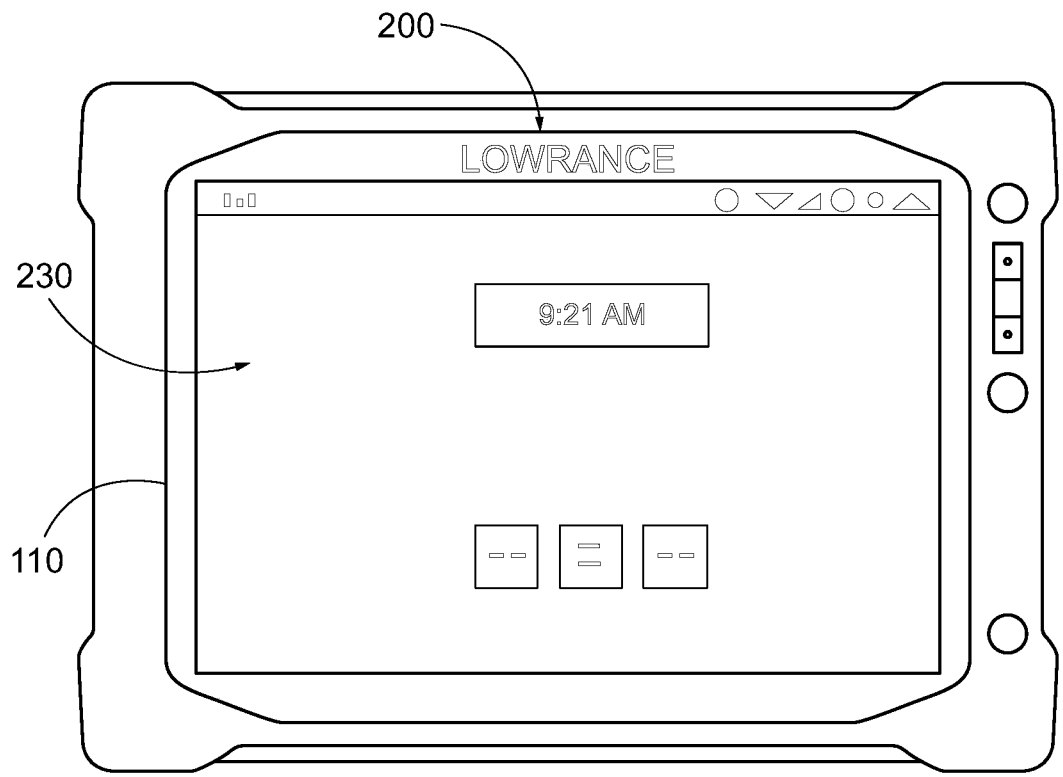
Figure 2C:
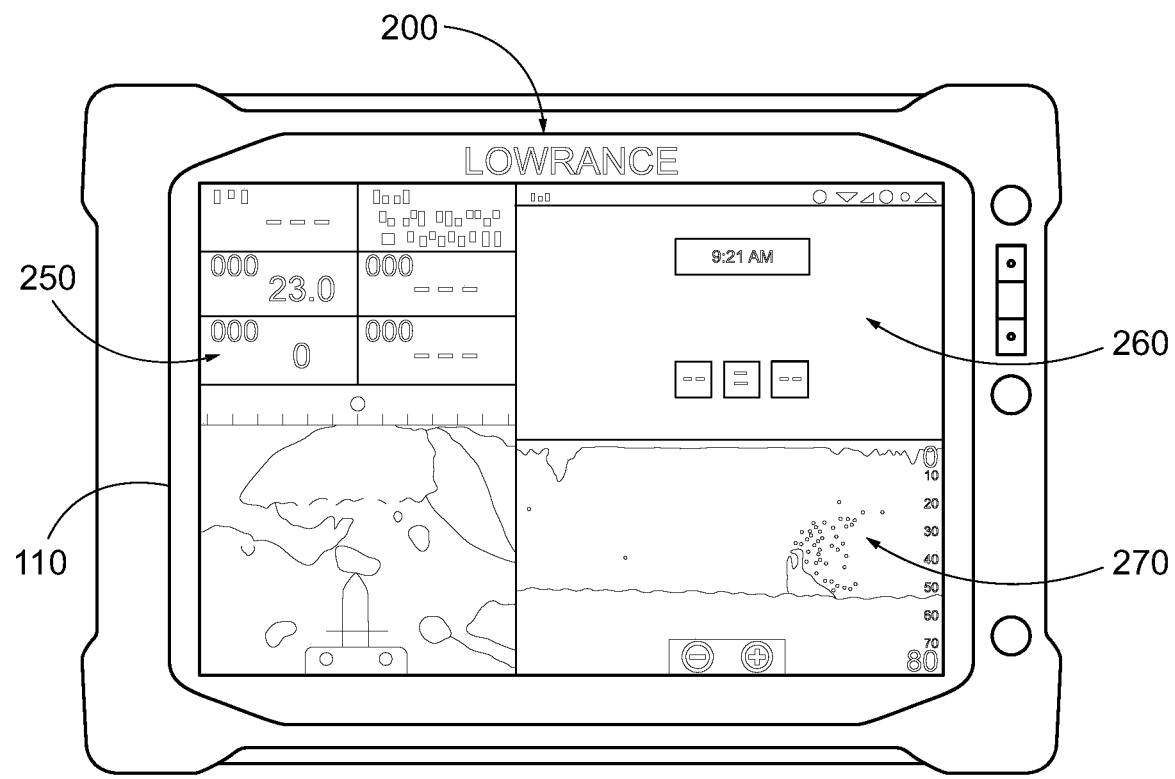
Figure 3:
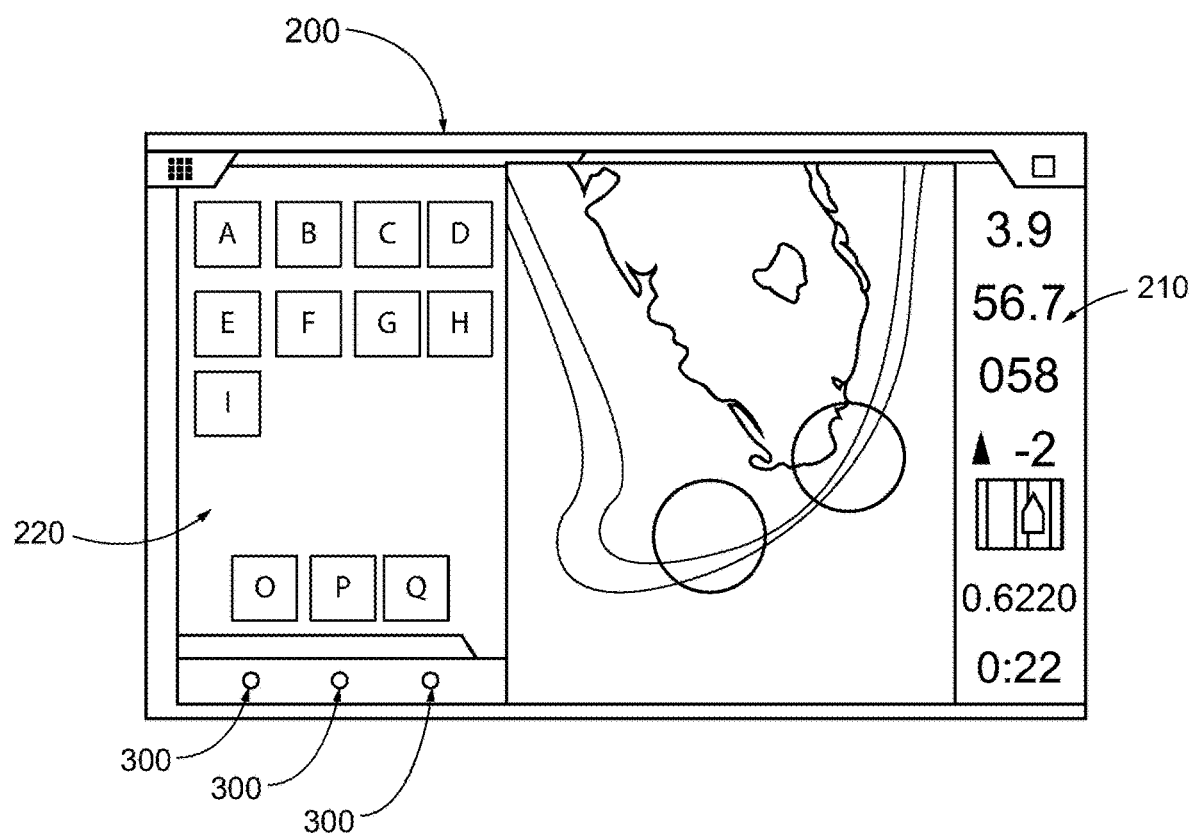
Figure 4:
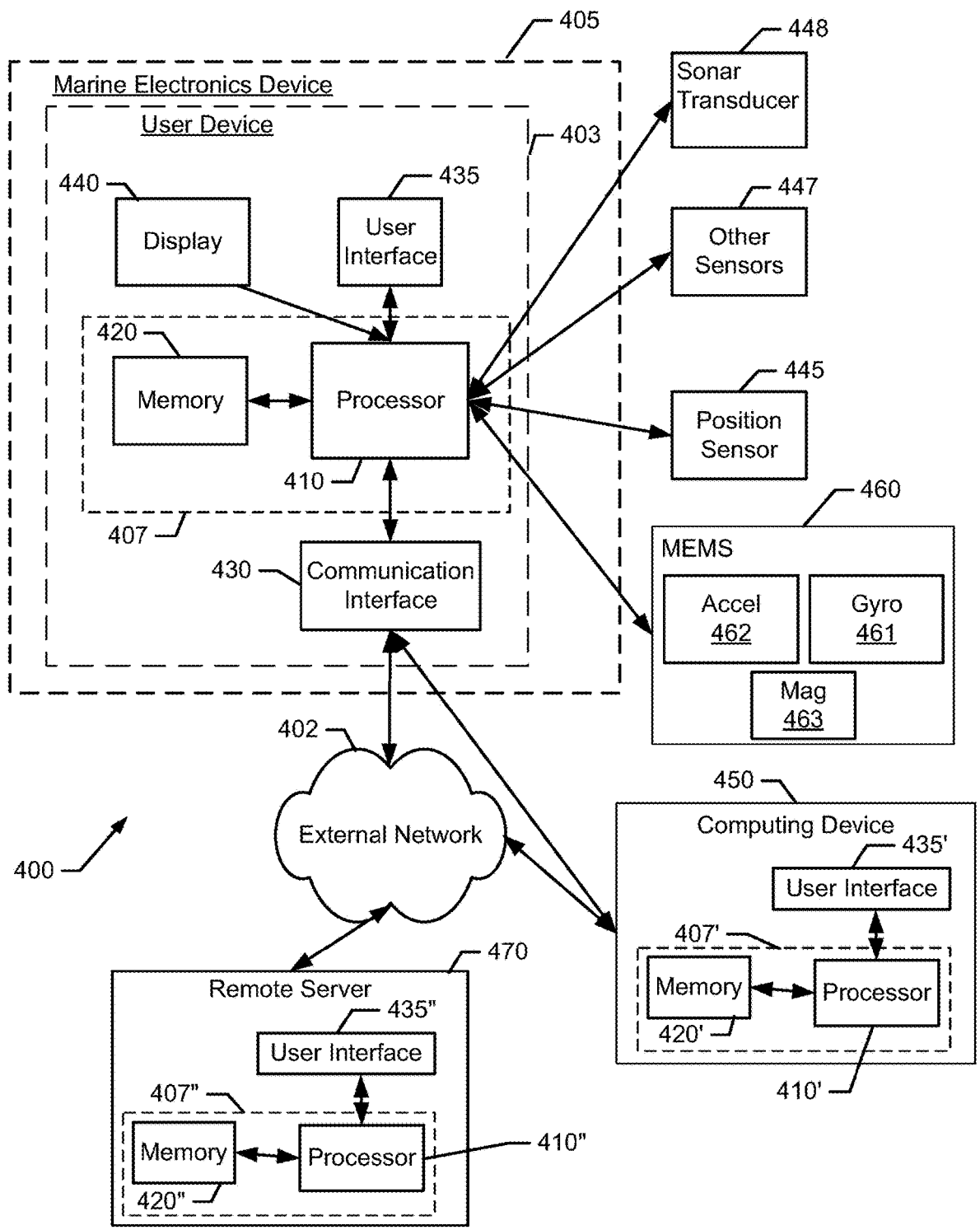
Figure 5A:
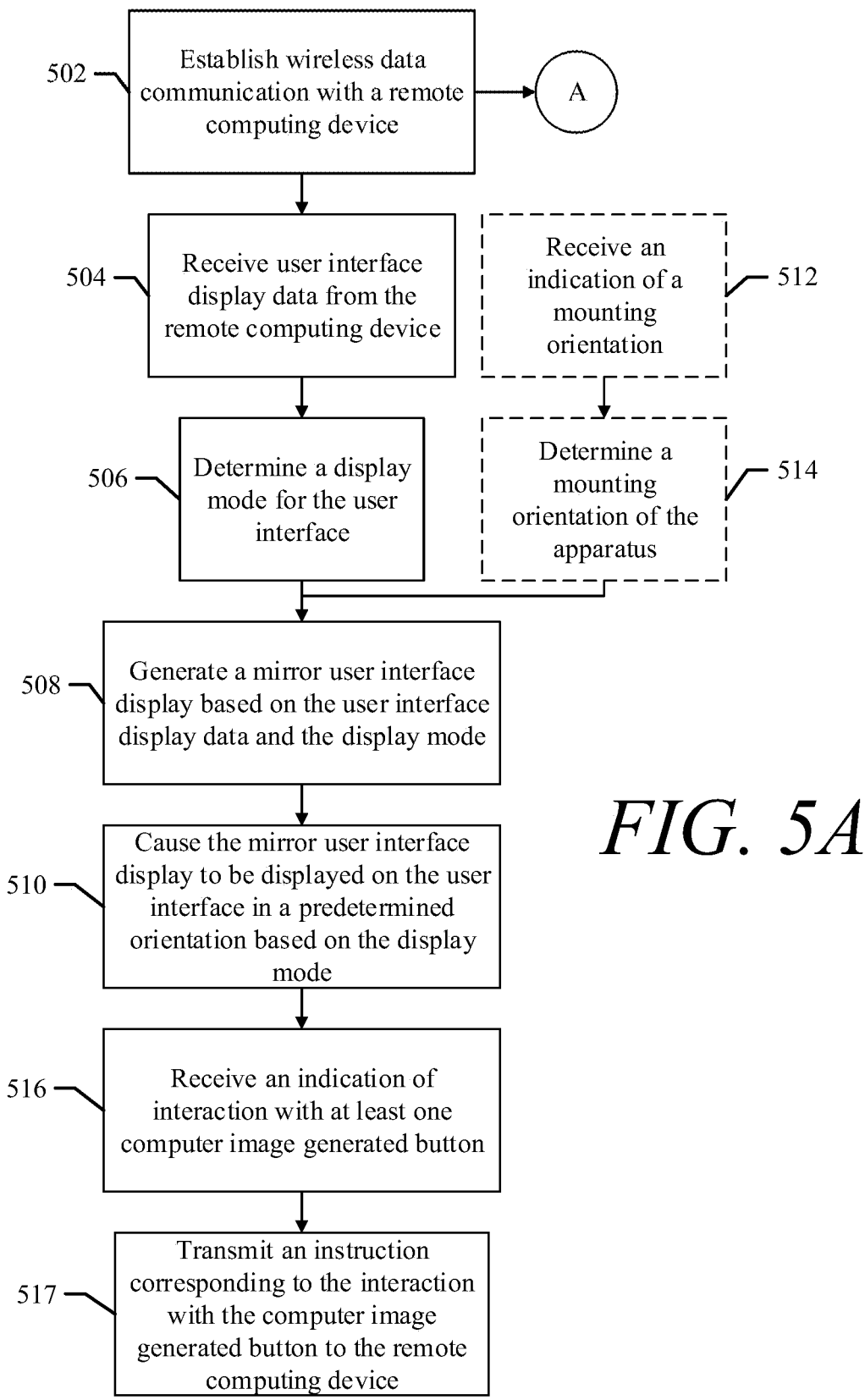
Figure 5B:
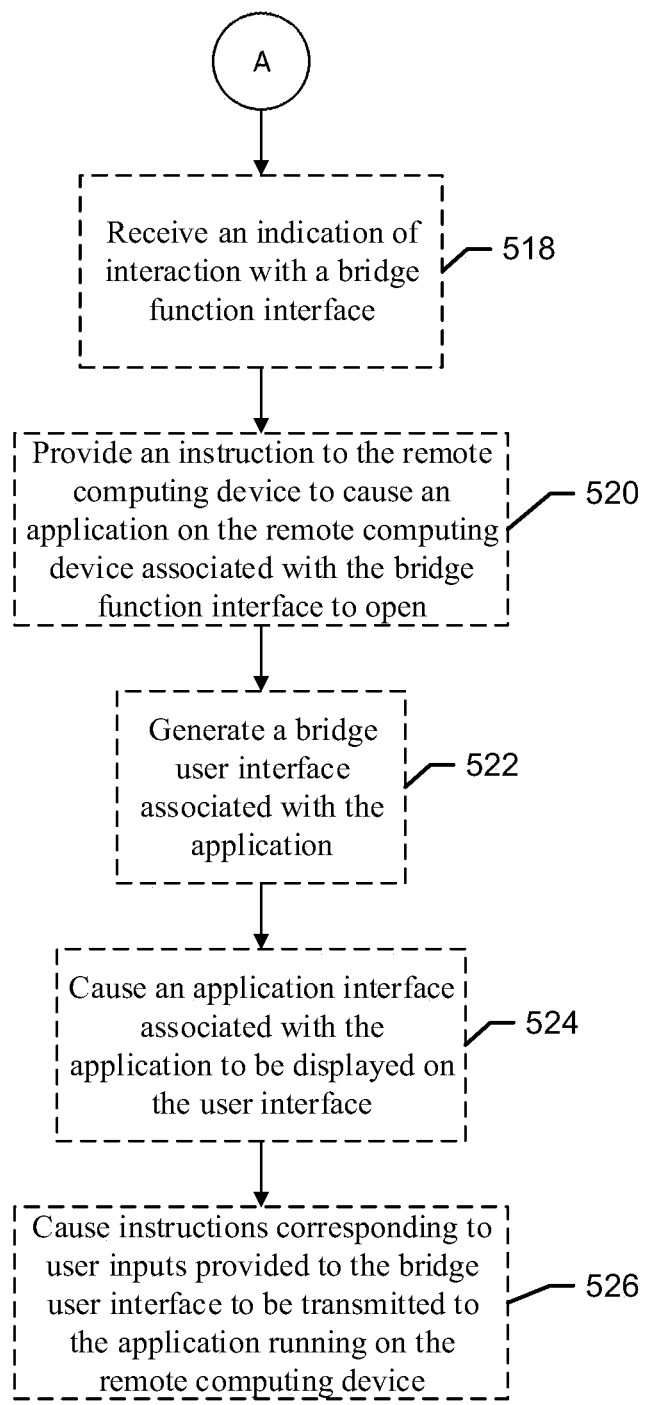

Having thus described the invention in general terms, reference will now be made to the accompanying drawings, which are not necessarily drawn to scale, and wherein:

FIG. 1 illustrates an example vessel including an MED and computing device, in accordance with some example embodiments;

FIG. 2A illustrates an example MED user interface in a split screen mode, in accordance with some embodiments discussed herein;

FIG. 2B illustrates an example MED user interface in a full screen mode, in accordance with some embodiments discussed herein;

FIG. 2C illustrates an example MED user interface in a multiscreen mode, in accordance with some embodiments discussed herein;

FIG. 3 illustrates an example MED user interface including example computer image generated (e.g., virtual) buttons, in accordance with some embodiments discussed herein;

FIG. 4 illustrates a block diagram of an example marine electronic system, in accordance with some example embodiments discussed herein; and FIGS. 5A and 5B illustrate flowcharts of an example method of operating an MED according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft, e.g. vessel 100, configured to traverse a marine environment, e.g. body of water 101, may use one or more sonar transducer assemblies 102 disposed on and/or proximate to the vessel. The vessel 100 may be a surface watercraft, a submersible watercraft, or any other implementation known to those skilled in the art.

In an example embodiment, a vessel 100 may include a main propulsion motor 105, such as an outboard or inboard motor. Additionally, the vessel 100 may include a trolling motor 108 configured to propel the vessel 100 or maintain a position. The one or more transducer assemblies 102 may be mounted in various positions and to various portions of the vessel 100 and/or equipment associated with the vessel 100, such as a transom 106 of the vessel 100, a bottom or side of the hull 104 of the vessel 100, the trolling motor 108, etc.

The watercraft may be provided with a marine electronics device (MED) 110, also referred to as a multi-function display. The MED may provide a user data about the body of water including, for example, sonar data, positioning data, environmental conditions, or the like collected by the transducers 102, environmental sensors, positioning sensors, or the like. Sonar data may be used to detect features of and/or objects in an underwater environment. In particular, when analyzed, sonar return data may be used to determine depths of a marine environment, detect fish or other waterborne objects, locate wreckage, and/or the like. Position data may be used to determine the location of a water vessel in the marine environment, plot a position of the watercraft on a navigational chart, and/or determine a route to, or between, one or more waypoints. Environmental data may provide a user with information regarding water temp, wind speed or direction, current, or the like.

In addition to the MED 110, a user may bring a one or more computing devices 120 aboard the vessel 100. The computing devices 120 may include, without limitation smart phones, tablet computers, laptop computers, wearable computing devices, or the like. In some example embodiments, the MED 110 may be configured to establish data communication with the computing device 120, such that the user interface of the computing device is mirrored or projected on the user interface of the MED. One such example is described in U.S. Application Publication No. U.S. 2016/0313955, entitled "Smart Device Mirroring," filed on Apr. 27, 2015, which is assigned to the Assignee of the present invention and incorporated by reference herein in its entirety. The data communication between the MED 110 and the computing device may be wired communication, such as a USB connection, or a wireless connection, such as WiFi, Bluetooth, Bluetooth low energy (BLE), near field communication (NFC), or the like.

In some example embodiments, the MED 110 may be configured to remember computing devices 120 and automatically connect with a computing device 120, when the computing device 120 is proximate to the MED 110. For example, the user may register, or pair, the computing device 120 with the MED 110 using WiFi, Bluetooth, BLE, NFC, or the like. The MED may store the communication settings in memory, such that when the computing device 120 is subsequently brought within communication range of the MED 110, the MED 110 automatically establishes data communication with the computing device 120. The MED 110 may establish data communication in the same method as the data connection used during the registration process or may establish alternative data connections, based on the communications settings authorized by the user. For example the user may pair the computing device 120 with the MED 110 using BLE and authorized WiFi, Bluetooth, BLE, or other communication types. During subsequent connections, the MED 110 may establish communications with the computing device 120 with any, multiple, or all of the authorized data connection types.

In an example embodiment, the MED 110 may utilize the computing device 120 for data communication with the internet, cloud database, or the like. The MED 110 may transmit data to the computing device 120 via a BLE, local Wi-Fi connection, or the like. The computing device 120 may then, in turn, transmit the data to a cloud database or third party utilizing, cellular communication, satellite communication, WiFi, or the like. In some cases, the data may be automatically transmitted by the MED 110 and computing device 120 based on one or more settings in an application, the MED 110, and/or the computing device 120, such as digital services or updates to the MED 110, computing device 120, and/or the application.

As shown in FIG. 1, the remote computing device 120 may be any type of computing device, such as a user's mobile device (shown in a user's hand) or another computing device (such as a tablet, desktop, laptop, etc.—such as shown as the dotted line box).

Turning to FIGS. 2A, 2B, and 2C, the MED 110 may be configured to dynamically adjust a mirrored user interface display between at least landscape and portrait views based on the status of the MED display 200, such as full screen, split screen, multiscreen modes, or the like and/or a preference user interface orientation of an application.

In the example depicted in FIG. 2A, the MED display 200 is in a split screen mode. A marine environment display 210 is displayed on the left portion of the MED display 200 and a computing device display 220 is displayed on the right portion of the MED display 200. The marine environment display 210 may include sonar data, water temperature, current, wind direction and/or speed, position data chart data, propulsion system data, or the like. The computing device display 220 may include one or more application interfaces for one or more applications running on the computing device 120. In the split screen mode, the MED 110 may display the computing device interface 220 in a portrait view, which may fit better (e.g., than landscape view) in the available display space dedicated for the interface 220. For example, the portrait view may enable larger font within the interface 220, thereby forming a better user experience.

In the example depicted in FIG. 2B, the MED display 200 is in a full screen mode. A second computing device interface 230 is depicted in a landscape view. In such a view, the available space on the display is better utilized. In this regard, the MED 110 may dynamically change the view of the computing device interface 220, 230 between the landscape and portrait view to utilize the maximum available space in the MED display 200 in a manner similar to a display of the computing device 120.

In the example depicted in FIG. 2C, The MED 110 is in a multiscreen mode. In the multiscreen mode, greater than two screens, e.g. three screens, four screens, or the like, may be depicted on the MED display 200. A marine environment display 250 is displayed on the left portion of the MED display 200, a computing device display 260 is displayed on the upper right portion of the MED display 200, and a sonar display 270 is displayed in the lower right portion of the MED display 200. The MED 110 may determine a best fit for each display mode based on the space available in each display mode, the location of the computing device interface 220, 230, 250 in the MED display 200 for each display mode, and/or one or more user-defined or application-defined settings.

Additionally or alternatively, the layout of the display modes may be based on a mounting orientation of the MED 110. For example, the MED display 200 may be rectangular with a longer width or height depending on the mounting orientation of the MED 110. In some example embodiments, the MED may be mounted in one of multiple orientations, such as vertically longer or horizontally longer, or may be configured to pivot between the vertically longer orientation and the horizontally longer orientation. The MED 110 may determine a mounting orientation, such as by receiving a user input identifying the mounting orientation, receiving an indication of orientation from an orientation sensor, or the like. The orientation sensor may include a gyroscope and/or an accelerometer, such as a portion of a microelectromechanical system (MEMS) configured to sense the orientation or change in orientation of the MED 110. The MED 110 may change the layout of the display modes based on the mounting orientation of the MED to maximize the utilization of space allocated to the mirror user interface on the user interface.

In some example embodiments, the MED 110 may emulate one or more physical buttons of the computing device 120. As depicted in FIG. 3, the MED display 200 may include one or more computer image generated (e.g., virtual) buttons 300 corresponding to one or more physical buttons of the computing device 120, such as a home button, back button, menu button of the like. The computer image generated buttons 300 may enable applications functions to be performed via the user interface of the MED 110 that were not previously possible through simple mirroring of the user interface of the computing device 120. In some example embodiments, the computing device 120 may render computer image generated buttons as a portion of the mirror user interface. In some embodiments, the MED 110 may hide either the computer image generated buttons generated by the MED in favor of portions of the mirror user interface or may replace the computer image generated buttons of the user interface with the computer image generated buttons emulated by the MED.

As shown, FIG. 3 depicts various icons (e.g., "A", "B", etc.) that correspond to available application icons on the corresponding computing device 120.

In an example embodiment, the MED 110 may be configured with one or more application bridge functions. For example, the MED 110 may have a bridge function interface, e.g. a physical or computer image generated button, such as a send text message button, that, when pressed, launches an application on the computing device 120 and/or the MED 110. This may enable the user of the MED 110 to more easily interact with the computing device 120. In an example in which the computer image generated button is a send text message button, the user may write the text message in an application interface provided by the MED 110, e.g. a bridge user interface, and the message may be transmitted to and entered into the message application running on the computing device 120. Additionally or alternatively, the text message button may cause the message application running on the computing device 120 to open and the application interface to be mirrored on the MED 110, such that the user can enter the message. This may provide a quick, one step, process for launching an application from the computing device 120 on the MED 110. Similarly, an email button, or other application button, may be provided and utilized in a similar manner to the described text message button.

In another example, the MED 110 may be provided with a screen shot button. The screen shot button may be a physical button associated with the MED 110 or a computer image generated button displayed on the user interface. The user may interact with the screen shot button to capture displayed marine data, including, but not limited to sonar data, chart and/or position data, marine or environmental conditions, or the like. The MED 110 may cause a communication application, such as text messaging or email application, running on the computing device 120 to be displayed on the MED 110 and populate the application with the screen shot data. The screen shot data may be text, still picture, and/or video data corresponding to the data displayed on the user interface at the time the screen shot was initiated. The user may then interact with the mirrored user interface to cause the computing device 120 to send the screen shot data to a third party, such as via cellular or WiFi communications.

Example Architecture

FIG. 4 shows a block diagram of an example system 400 including a marine electronics device 405 and other components (e.g., a remote server 470, a remote computing device 450, etc.). The marine electronics device 405 may include a number of different modules or components, each of which may comprise any device or means embodied in either hardware, software, or a combination of hardware and software configured to perform one or more corresponding functions. The marine electronics device may also be in communication with a network 402.

The marine electronics device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine data system 400.

The marine electronics device 405 may include a processor 410, a memory 420, a user interface 435, a display 440, and a communication interface 430. Additionally, the marine electronics device 405 may include or otherwise be in communication with one or more sensors (e.g. position sensor 445, other sensors 447, etc.) and/or one or more sonar transducers 448.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data, generate sonar image data, and generate one or more sonar images based on the sonar image data.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronics device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronics device 405 may retrieve stored data from a remote server 470 via the external network 402 in addition to or as an alternative to the onboard memory 420. Additionally or alternatively, the marine electronics device may transmit or receive data, such as sonar signals, sonar returns, sonar image data or the like to or from a sonar transducer 448. In some embodiments, the marine electronics device may also be configured to communicate with a propulsion system of the vessel 100. The marine electronics device may receive data indicative of operation of the propulsion system, such as engine or trolling motor running, running speed, or the like. In some example embodiments, the communications interface 430 may receive and transmit data to and from one or more computing devices 450.

The position sensor 445 may be configured to determine the current position and/or location of the marine electronics device 405. For example, the position sensor 445 may comprise a GPS, bottom contour, inertial navigation system, such as microelectromechanical sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 4 is shown as being directly connected to the processor 410 and within the marine electronics device 405, the display 440 could alternatively be remote from the processor 410 and/or marine electronics device 405. Likewise, in some embodiments, the position sensor 445 and/or user interface 435 could be remote from the marine electronics device 405.

The marine electronics device 405 may include one or more other sensors 447 configured to measure environmental conditions. The other sensors 447 may include, for example, an air temperature sensor, a water temperature sensor, a current sensor, a light sensor, a wind sensor, a speed sensor, or the like.

The sonar transducer 448 may be housed in a trolling motor housing, attached to the vessel 100 or, in some cases, be castable or otherwise remote. The sonar transducer 448 (such as in its various parts) may be configured to gather sonar return signals, e.g. sonar returns, from the underwater environment relative to the vessel 100. Accordingly, the processor 410 may be configured to receive the sonar return data from the sonar transducer 448, process the sonar return data to generate an image including a sonar image based on the gathered sonar return data. In some embodiments, the marine electronics device 405 may be used to determine depth and bottom contours, detect fish, locate wreckage, etc. In this regard, sonar beams or pulses from a sonar transducer 448 can be transmitted into the underwater environment. The sonar signals reflect off objects in the underwater environment (e.g. fish, structure, sea floor bottom, etc.) and return to the transducer assembly, which converts the sonar returns into sonar return data that can be used to produce a sonar image of the underwater environment.

The sonar transducer 448 may include one or more transducer assemblies, transducer arrays, or individual transducer elements that may transmit one or more sonar signals, e.g. sonar beams, into a body of water with a transmit transducer, a transmit/receive transducer, or similar device. When the sound waves, of the sonar beams, strike anything of differing acoustic impedance (e.g., the sea floor or something suspended in the water above the bottom), the sound waves reflect off that object. These echoes (or sonar return signals) may strike the transmitting transducer element and/or separate one or more sonar receiver elements, which convert the echoes back into an electrical signal which is processed by a processor (e.g., processing circuitry 407) and sent to a display (e.g., an LCD) mounted in the cabin or other convenient location in the watercraft. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to produce a sonar image representing the underwater environment.

In an example embodiment, the marine electronics device 405 may include or be associated with a gyroscope 461, an accelerometer 462, and/or a magnetometer 463. The gyroscope 461, the accelerometer 462, and/or the magnetometer 463 may be portions of a microelectromechanical system (MEMS) 460. The gyroscope 461 may be configured to measure an angular velocity of the gyroscope 461. In some example embodiments, the gyroscope 451 may be a vibrating structure MEMS gyroscope including gyroscopic sensors oriented in a plurality of axes. The accelerometer 462 may be configured to measure acceleration of the accelerometer. In some example embodiments, the accelerometer may be a variable capacitive (VC) MEMS accelerometer, a piezoresistive (PR) MEMS accelerometer, or the like. The magnetometer 463 may be configured to measure a magnetic field strength, which may be used to find magnetic north and/or a heading angle. In an example embodiment, the magnetometer may be a Lorentz force based MEMS sensor, electron tunneling MEMS sensor, MEMS compass, or the like. In an example embodiment, one or more of the gyroscope 461, accelerometer 462, or magnetometer 463 may be configured to sense an orientation or change in orientation of the MED 405.

The computing device 450 may include a laptop computer, smartphone, tablet computer, wearable smart device or the like. The computing device 450 may be configured to execute one or more applications, including without limitation, messaging applications, such as email or SMS messaging, positioning applications, data collections service applications, such as angler catch data applications, social media applications, or the like. The computing device 450 may be configured to establish a data connection with the MED 405 to share user interface data and/or device functionality with the MED 405, as described above. Additionally, the computing device 450 may be configured to establish a data connection with the external network 402.

The computing device 450 may also include processing circuitry 407' that is substantially similar to the processing circuitry 407 described above in regard to the MED 405. The processing circuitry 407' of the computing device 405 may include a processor 410' and memory 420' and be in data communication with a user interface 435'.

In a similar manner, the remote server may include processing circuitry 407" that is substantially similar to the processing circuitry 407 described above in regard to the MED 405. The processing circuitry 407" of the remote server 470 may include a processor 410" and memory 420" and be in data communication with a user interface 435".

Example Flowchart(s) and Operations

Embodiments of the present invention provide methods, apparatus and computer program products for providing user interface mirroring between a computing device and a marine electronics device. Various examples of the operations performed in accordance with embodiments of the present invention will now be provided with reference to FIGS. 5A and 5B.

FIGS. 5A and 5B illustrate flowcharts according to example methods for providing user interface mirroring between a computing device and a marine electronics device according to an example embodiment. The operations illustrated in and described with respect to FIGS. 5A and 5B may, for example, be performed by, with the assistance of, and/or under the control of one or more of the processor 410, memory 420, communication interface 430, user interface 435, position sensor 445, other sensor 447, display 440, and/or MEMS 460.

The method may establishing wireless data communication with a remote computing device at operation 502, receiving user interface display data from the remote computing device at operation 504, determining a display mode for the user interface at operation 506, generating a mirror user interface display based on the user interface display data and the display mode at operation 508, and causing the mirror user interface display to be displayed on the user interface in a predetermined orientation based on the display mode at operation 510.

In some embodiments, the method may include additional, optional operations, and/or the operations described above may be modified or augmented. Some examples of modifications, optional operations, and augmentations are described below, as indicated by dashed lines, such as, receiving an indication of a mounting orientation at operation 512 and determining a mounting orientation of the apparatus at operation 514. In an example embodiment, the method may include receiving an indication of interaction with at least one computer image generated button at operation 516 and transmitting an instruction corresponding to the interaction with the computer image generated button to the remote computing device at operation 517. In some example embodiments, the method may include receiving an indication of interaction with a bridge function interface at operation 518, providing an instruction to the remote computing device to cause an application on the remote computing device associated with the bridge function interface to open at operation 520, and generating a bridge user interface associated with the application at operation 522. The method may also include causing an application interface associated with the application to be displayed on the user interface at operation 524 and causing instructions corresponding to user inputs provided to the bridge user interface to be transmitted to the application running on the remote computing device at operation 526.

FIGS. 5A and 5B illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronics device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronics device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. An apparatus for providing marine information corresponding to a watercraft, the apparatus comprising:
   a housing for mounting to the watercraft, wherein the housing comprises:
   a user interface defining a length dimension and a width dimension, wherein the width dimension is greater than the length dimension, wherein the width dimension is perpendicular to the length dimension, wherein the housing may be mounted to the watercraft in one of a plurality of orientations, wherein the plurality of orientations comprise at least a first orientation and a second orientation, wherein, when the housing is mounted in the first orientation, the length dimension is generally vertical with respect to a floor of the watercraft, wherein, when the housing is mounted in the second orientation, the width dimension is generally vertical with respect to the floor of the watercraft;
   a processor; and
   a memory including computer program code, the memory and the computer program code configured to, with the processor, cause the apparatus to:
     establish data communication with a remote computing device;
     receive user interface display data from the remote computing device;
     determine a display mode for the user interface;
     determine a mounting orientation of the apparatus with respect to the floor of the watercraft;
     generate a mirror user interface display based on the user interface display data; and
     cause the mirror user interface display to be displayed on the user interface in an orientation based on the determined mounting orientation of the apparatus with respect to the floor of the watercraft and the display mode.

2. The apparatus of claim 1, wherein the memory and computer program code are further configured to cause the apparatus to:
   dynamically adjust the orientation of the mirror user interface display based on a change in the display mode of the user interface.

3. The apparatus of claim 1, wherein the determined orientation comprises a landscape orientation or a portrait orientation.

4. The apparatus of claim 3, wherein the display mode comprises a full screen mode and a split screen mode, and wherein the memory and computer program code are further configured to cause the apparatus to generate the mirror user interface display in the landscape orientation in an instance in which the display mode is the full screen mode and in the portrait orientation in an instance in which the display mode is the split screen mode.

5. The apparatus of claim 1, wherein the display mode comprises a full screen mode, a split screen mode, or a multiscreen mode.

6. The apparatus of claim 5, wherein the split screen mode comprises at least two user interface areas, and wherein the mirror user interface display is displayed in one of the at least two user interface areas.

7. The apparatus of claim 1, wherein the mounting orientation is determined based on a user input defining the mounting orientation of the apparatus.

8. The apparatus of claim 1, wherein the mounting orientation is determined based on an orientation indication received from an orientation sensor associated with the apparatus.

9. The apparatus of claim 8, wherein the orientation sensor comprises a gyroscope or accelerometer.

10. An apparatus for providing marine information, the apparatus comprising:
    a housing for mounting to a watercraft, wherein the housing comprises:
    a user interface defining a length dimension and a width dimension, wherein the width dimension is greater than the length dimension, wherein the width dimension is perpendicular to the length dimension, wherein the housing may be mounted to the watercraft in one of a plurality of orientations, wherein the plurality of orientations comprise at least a first orientation and a second orientation, wherein, when the housing is mounted in the first orientation, the length dimension is generally vertical with respect to a floor of the watercraft, wherein, when the housing is mounted in the second orientation, the width dimension is generally vertical with respect to the floor of the watercraft;

a processor; and a memory including computer program code, the memory and the computer program code configured to, with the processor, cause the apparatus to:

establish data communication with a remote computing device;

receive an indication of interaction with a bridge function interface;

provide instructions to the remote computing device to cause an application on the remote computing device associated with the bridge function interface to open;

determine a mounting orientation of the apparatus with respect to the floor of the watercraft; and cause an application interface associated with the application to be displayed on the user interface in an orientation based on the determined mounting orientation of the apparatus with respect to the floor of the watercraft.

11. The apparatus of claim 10, wherein the application interface comprises a mirror user interface.

12. The apparatus of claim 10, wherein the memory and computer program code are further configured to cause the apparatus to:

generate a bridge user interface associated with the application, wherein the application interface comprises the bridge user interface; and cause instructions corresponding to user inputs provided to the bridge user interface to be transmitted to the application running on the remote computing device.

13. The apparatus of claim 10, wherein the application is a text message application.

14. The apparatus of claim 10, wherein the application is an email application.

15. The apparatus of claim 10, wherein the memory and computer program code are further configured to cause the apparatus to:

capture marine data; and cause the captured marine data to be transmitted to the application running on the computing device.

16. The apparatus of claim 10, wherein the captured marine data comprises text data, picture data, or video data corresponding to data displayed on the user interface at a time when the bridge function interface was interacted with.

17. An apparatus for providing marine information, the apparatus comprising:

a housing for mounting to a watercraft, wherein the housing comprises:

a user interface defining a length dimension and a width dimension, wherein the width dimension is greater than the length dimension, wherein the width dimension is perpendicular to the length dimension, wherein the housing may be mounted to the watercraft in one of a plurality of orientations, wherein the plurality of orientations comprise at least a first orientation and a second orientation, wherein, when the housing is mounted in the first orientation, the length dimension is generally vertical with respect to a floor of the watercraft, wherein, when the housing is mounted in the second orientation, the width dimension is generally vertical with respect to the floor of the watercraft;

a processor; and a memory including computer program code, the memory and the computer program code configured to, with the processor, cause the apparatus to:

establish data communication with a remote computing device;

receive user interface display data from the remote computing device;

determine a mounting orientation of the apparatus with respect to the floor of the watercraft;

generate a mirror user interface display based on the user interface display data; and cause the mirror user interface display to be displayed on the user interface in an orientation based on the determined mounting orientation of the apparatus with respect to the floor of the watercraft, wherein the mirror user interface display comprises at least one computer image generated button corresponding to a physical button on the remote computing device.

18. The apparatus of claim 17, wherein the memory and computer program code are further configured to cause the apparatus to:

receive an indication of interaction with a computer image generated button; and transmit an instruction to the remote computing device, wherein the instruction corresponds to the interaction with the computer image generated button.

19. The apparatus of claim 17, wherein the at least one computer image generated button comprises a home button, a back button, or a menu button.

* * * * *